Patented Dec. 15, 1925.

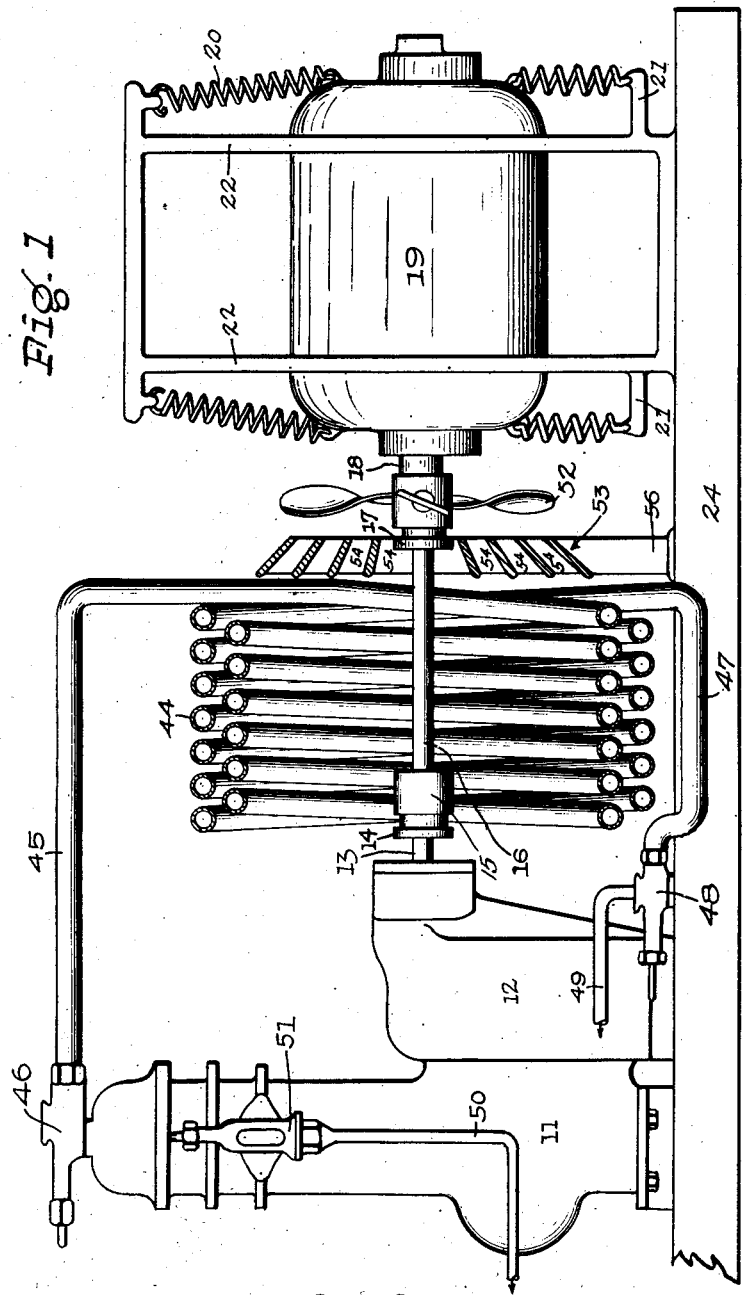

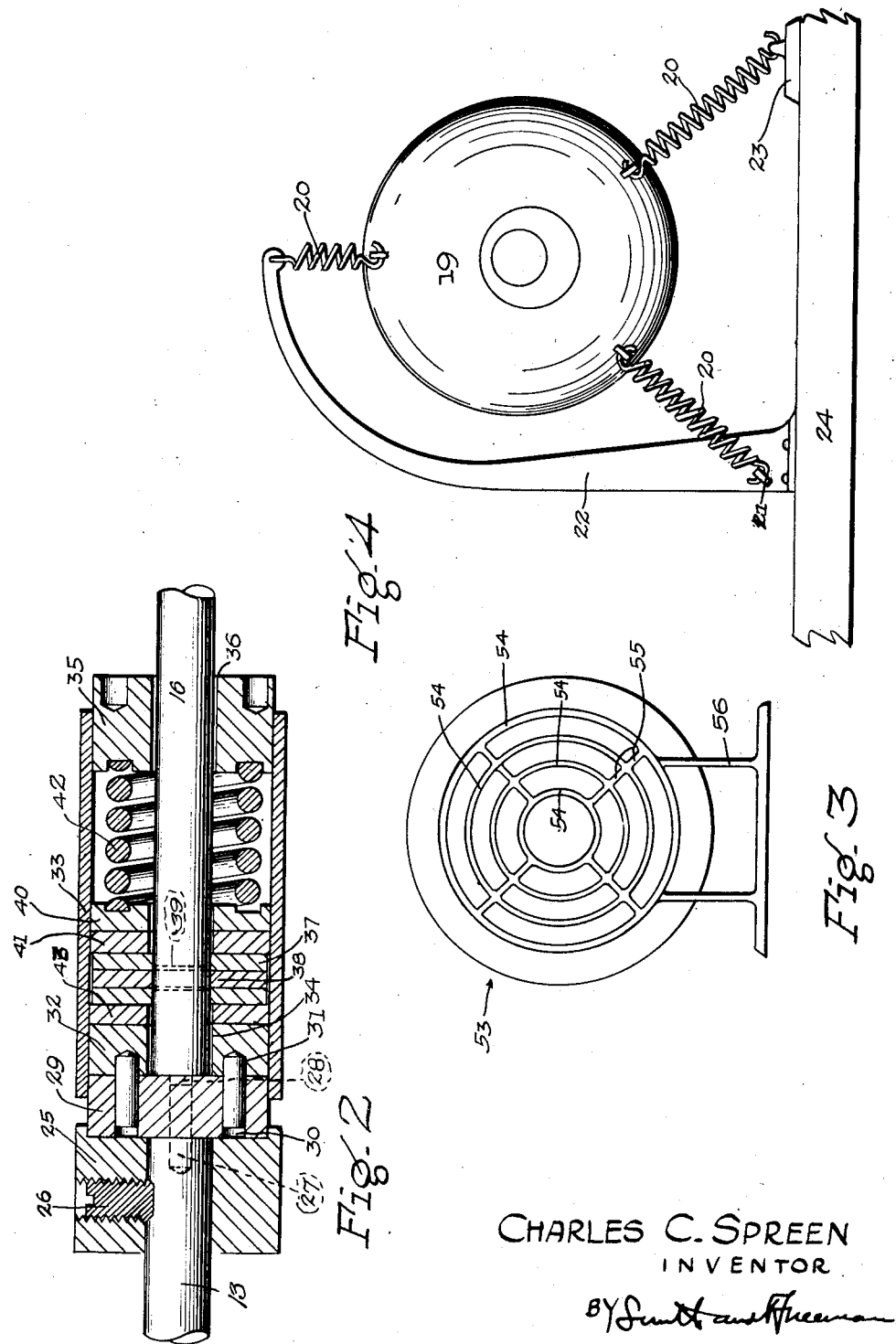

1,566,254

UNITED STATES PATENT OFFICE.

CHARLES C. SPREEN, OF DETROIT, MICHIGAN, ASSIGNOR, BY MESNE ASSIGNMENTS, TO KELVINATOR CORPORATION, OF DETROIT, MICHIGAN, A CORPORATION OF MICHIGAN.

DRIVE UNIT.

Application filed October 2, 1923. Serial No. 666,087.

*To all whom it may concern:*

Be it known that I, CHARLES C. SPREEN, a citizen of the United States, residing at Detroit, in the county of Wayne and State of Michigan, have invented a certain new and useful Improvement in Drive Units, of which the following is a full, clear, and exact description, reference being had to the accompanying drawings.

The adaptation of mechanical refrigerating systems to small units suitable for installation in stores and houses has necessitated introducing into the systems heretofore used a large number of improvements particularly designed to increase the applicability of such systems to such use. My invention provides a compressor unit embodying further such improvements and therefore superior to any previous compressor unit at least for use in these small installations. In the drawings accompanying this specification and forming a part thereof I have shown, for purposes of illustration, one physical embodiment which my invention may assume. In these drawings:

Figure 1 is a side elevation of this illustrative embodiment of my invention showing the condenser coil and deflector in section, Figure 2 is a longitudinal section through the over running clutch shown generally in side elevation in Figure 1, Figure 3 is an end view of the deflector, while Figure 4 is an end view showing in detail the motor support.

The compressor unit herein shown comprises a compressor 11 operated through reduction gears positioned within a gear housing 12 formed integral with the housing of the compressor 11 and driven by a shaft 13 which is itself operated, through a universal joint 14, an over running clutch 15, an intermediate shaft 16, and a universal joint 17, from the armature shaft 18 of an electric motor 19 supported by means of a plurality of springs 20 from supporting members 21 carried by bracket arms 22 and plates 23 secured to the compressor unit base plate 24 which also carries the compressor unit 11.

The construction of the universal joint 14 and over running clutch 15 is more clearly shown in Figure 2 wherein this portion of the compressor unit is shown as comprising a collar 25 secured by means of a set screw 26 to the compressor operating shaft 13 and carrying a pair of pins 27 arranged to fit within cooperating apertures 28 in a flexible disc 29 which is provided with further apertures 30 arranged to cooperate with pins 31 extending from the face of a collar 32 which is unitary with a sleeve 33 and is provided with a central aperture 34 arranged to surround the intermediate shaft 16 to permit the collar 32 to cooperate with a second collar 35 also carried by the sleeve 33 and provided with an aperture 36 surrounding the intermediate shaft 16 whereby the collars 32 and 35 support the sleeve 33 upon the shaft 16 freely rotatable with respect thereto. Positioned upon the shaft 16 interiorly of the sleeve 33 is a friction disc 37 secured against rotation upon the shaft 16 by means of a pin 38 carried by the disc 37 and passing through an aperture 39 in the shaft 16 elongated to permit limited movement of the disc 37 longitudinally of the shaft 16. Also positioned within the sleeve 33 and keyed thereto to permit longitudinal movement thereof relative to the sleeve 33 while preventing rotation thereof relative to the sleeve 33, is a disc 40 carrying a friction face 41 arranged, when the disc 40 is pressed toward the collar 32, by a spring 42 compressed between the disc 40 and the collar 35, to cooperate with a friction face 43 carried by the collar 32 to frictionally engage the disc 37 carried by the shaft 16 between the friction faces 41 and 43 to thus transmit to the sleeve 33 and ultimately to the shaft 13 rotation of the intermediate shaft 16 while permitting rotation of the shaft 16 independently of the shaft 13 when the resistance to rotation of the shaft 13 reaches a value sufficient to cause the disc 37 to slip over the friction faces 41 and 43.

The universal joint 17 may be formed similar to the universal joint 14.

Positioned between the compressor 11 and the motor 19 and surrounding the drive connecting the motor 19 to the compressor 11 is a condensing coil 44 suitable for condensing the refrigerant after it has been compressed by the compressor 11 and therefore shown as having one end connected by means of a duct 45 to the outlet 46 of the compressor and the other end connected by means of a duct 47 to a shut-off valve 48 which is then connected by means of a duct 49 through the expansion valve and expansion coil (not shown) to a duct 50 leading to the inlet 51 of the compressor 11.

In order to equalize the load imposed upon the motor 19 by the compressor 11 it is desirable to provide some sort of fly wheel. In order to increase the circulation of air through the condenser coil 44 I prefer to form this fly wheel in the form of a fan 52. In order to better distribute the air current among the various turns of the condenser coil 44 I prefer to interpose between the fan 52 and the condenser coil 44 a deflector 53 comprising a plurality of frustro-conical surfaces 54 separated and interconnected by means of cross members 55 and supported by means of a pedestal 56 arranged to be secured to the base plate 24 of the compressor unit.

From the above description it will be apparent that I have provided a compressor unit better adapted for use in small refrigerating units than any compressor unit heretofore produced particularly because of the provision of means for mounting the motor in such manner that vibration thereof can not be transmitted to the remainder of the unit to cause annoying vibration of the entire unit and because of the provision of means for directing the air current upon the condenser coil in such manner that the current strikes every turn of the coil and is utilized with the maximum efficiency. It will be apparent to those skilled in the art that the unit herein shown possesses advantages other than those specifically set forth and also that the construction herein shown may be variously changed and modified without sacrificing these advantages or departing from the spirit of my invention. It will therefore be apparent that the disclosure herein is illustrative only and my invention not limited thereto.

I claim:

1. In combination, a first device, a second device, a normally rigid shaft drive connecting said devices, means resiliently supporting at least one of said devices to permit translatory movement of said device perpendicularly of the axis of said shaft drive, and means interposed in said drive adapted to permit such movement in any direction and to also permit operation of one of said devices independently of the other device when the operation resisting torque of such other device reaches an abnormal value.

2. In combination, a first device, a second device, a normally rigid shaft drive connecting said devices, a plurality of supporting members positioned about one of said devices, a plurality of springs entirely supporting said device from said supporting members to permit translatory movement of said device perpendicularly of the axis of said shaft drive, and means interposed in said drive adapted to permit such movement in any direction and to also permit operation of one of said devices independently of the other device when the operation resisting torque of such other device reaches an abnormal value.

In testimony whereof, I hereunto affix my signature.

CHARLES C. SPREEN.